Dec. 26, 1961  C. J. HUFFMAN ET AL  3,014,583
EXTRUSION APPARATUS
Filed April 11, 1957  2 Sheets-Sheet 1
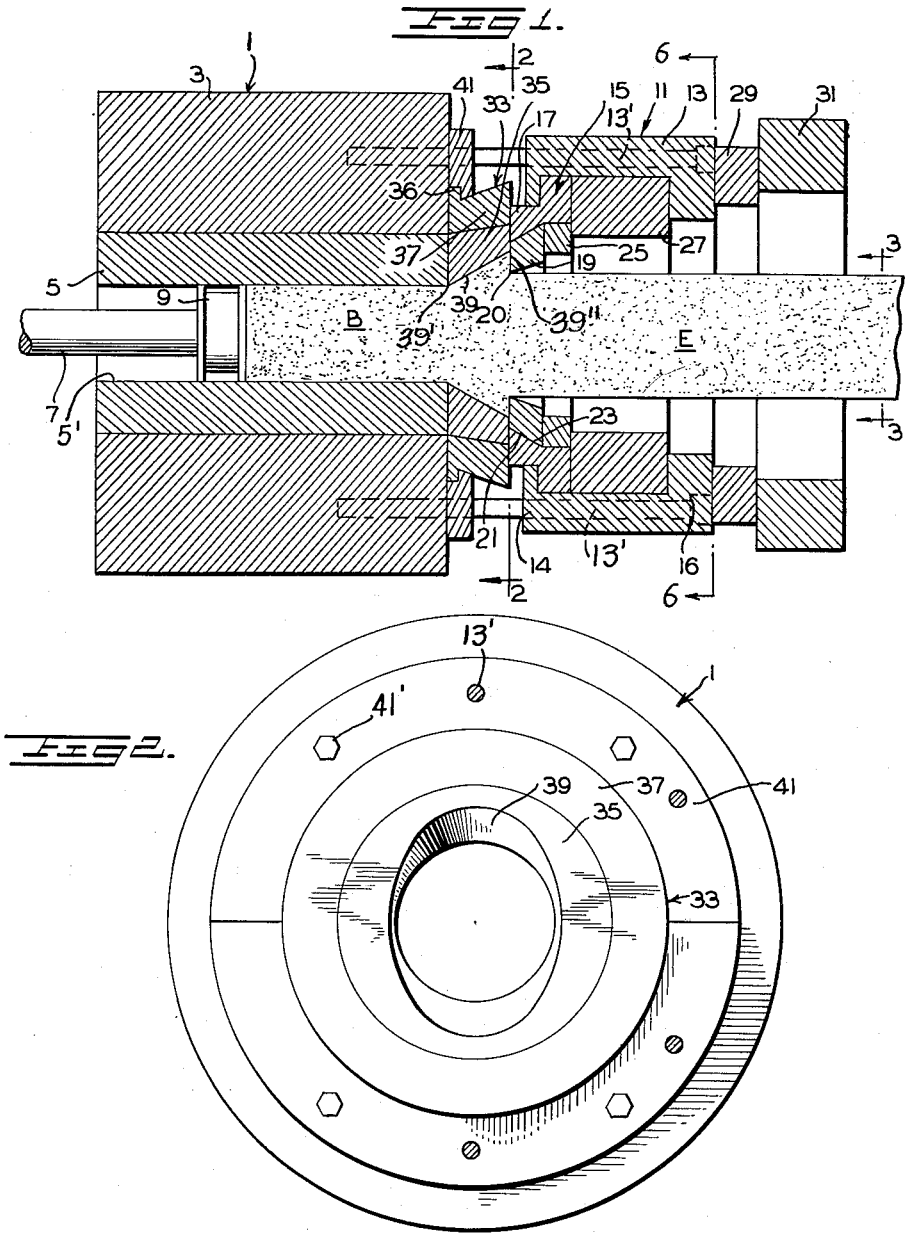
INVENTORS
CLIFTON J. HUFFMAN
ROLAND J. DAVIS
BY James E. Tooney
ATTORNEY

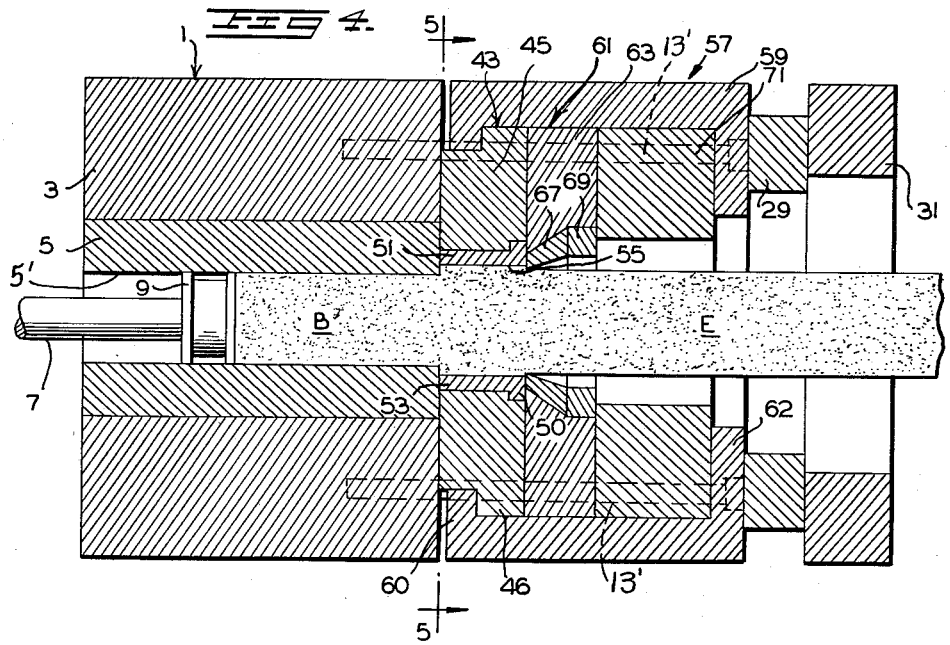
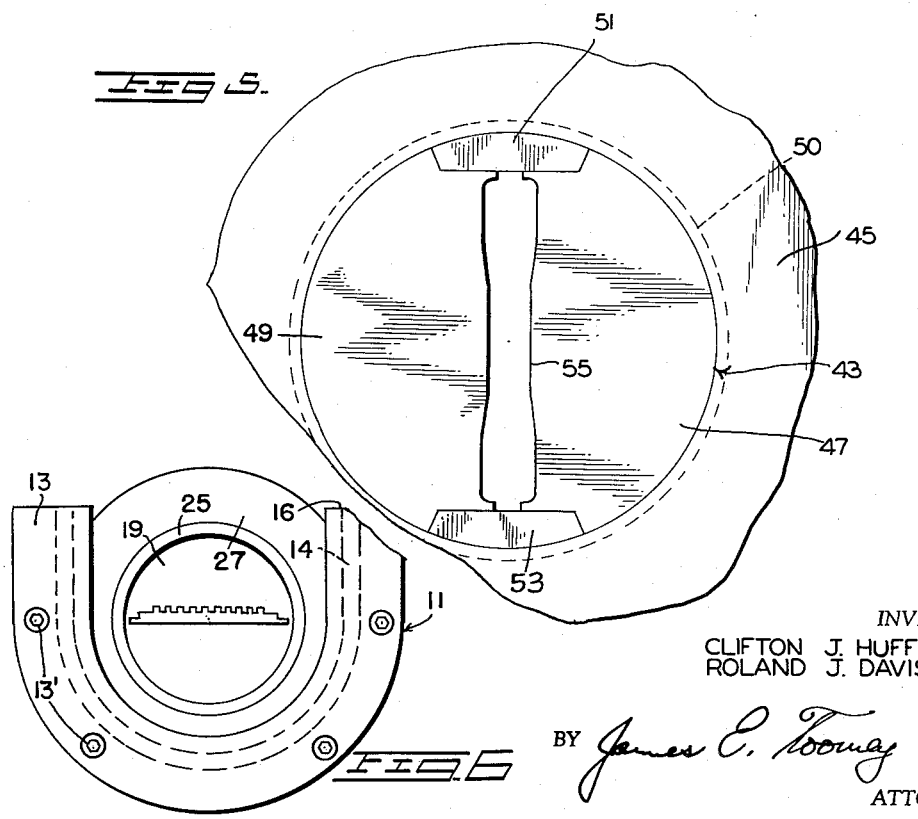

| United States Patent Office | 3,014,583
Patented Dec. 26, 1961 |

3,014,583
EXTRUSION APPARATUS
Clifton J. Huffman, Baltimore, and Roland J. Davis, Linthicum Heights, Md., assignors to Kaiser Aluminum & Chemical Corporation, Oakland, Calif., a corporation of Delaware
Filed Apr. 11, 1957, Ser. No. 652,178
3 Claims. (Cl. 207—2)

This invention relates to apparatus for extruding metal. More particularly, it relates to apparatus for making extrusions which have a cross-sectional dimension greater than the largest cross-sectional dimension of the cast metal bodies from which they are extruded.

In the extruding of metals, e.g., aluminum and aluminum alloys, a cast billet, usually cylindrical in shape, is heated to the desired extruding temperature and positioned in an extrusion press, comprising generally an extrusion cylinder or container, a ram which is fitted with a dummy block somewhat smaller than the cylinder diameter, and a die having an opening conforming to the cross-sectional configuration of the desired extrusion. As the billet is forced against the die by the ram, the metal of the billet is caused to flow or extrude through the die opening. The greatest cross-sectional dimension of the extrusions which have heretofore been generally produced has been limited to a measurement which is smaller than the diameter of the cylinder or of the billet. If extrusions having a larger cross-sectional dimension are desired, it is necessary to use a billet having a commensurate diameter. In addition to requiring billets of a large diameter, a larger container and consequently greater extruding pressures are also necessary. There is a steadily growing demand for extrusions having a large cross-sectional dimension, for example, having a width of 20 inches or above. Some examples of wide extrusions which are now being desired by industry are integrally stiffened wing panel extrusions of aluminum and aluminum alloys for use in the aircraft industry, wide deck plates used in the shipbuilding industry, truck flooring panels and architectural panels. These wide sections may be extruded without increasing the billet diameter by extruding the sections in a U or V form or as a tube. This, however, entails flattening the extrusion in the case of the U or V form and cutting and flattening in the case of the extrusion in the tube form. In the flattening of these sections it is exceedingly difficult to meet the tolerances required by industry. Consequently, the production costs of making these extrusions has been high. Also, there has been an effort to design billets or ingots having a cross-section with a principal dimension commensurate with that of the largest cross-sectional dimension of the desired extrusion, for example, an ingot of rectangular cross-section with a wide width and a narrow depth. Besides the casting difficulties experienced in casting these irregular sized ingots, this method of extruding wide sections requires specially designed presses, and increased pressures to overcome the increased sidewall friction experienced when using a container having a rectangular cross-section as compared to a cylindrical container having the same cross-sectional area.

Therefore, it is a primary object of this invention to provide apparatus for making an extrusion having at least one cross-sectional dimension which is at least equal to the largest cross-sectional dimension of the cast metal body from which it is extruded.

It is also an object of this invention to provide attachments for use with extrusion presses which attachments make possible the extruding of sections having a cross-sectional dimension greater than the largest cross-sectional dimension of the cast metal body from which it is extruded.

It is a further object of this invention to provide apparatus for extrusion presses for extruding a section having a cross-sectional dimension greater than the largest cross-sectional dimension of the cast metal body from which it is extruded, said apparatus being removably affixed to the press thereby enabling an extrusion press to be economically used for the production of various size extruded sections.

These and other objects and advantages of the invention will be apparent from the ensuing detailed description when taken in conjunction with the drawings wherein:

FIGURE 1 represents a partial sectional plan view through an extrusion press container and tool assembly employing a suitable attachment for practicing the invention.

FIGURE 2 is a view of the attachment shown in FIGURE 1 when taken along the line 2—2 in FIGURE 1.

FIGURE 3 is a view of a typical extrusion formed on the apparatus shown in FIG. 1 and taken along the line 3—3 in FIGURE 1.

FIGURE 4 represents a partial sectional plan view through an extrusion press container and tool assembly employing a second embodiment of the invention.

FIGURE 5 is an enlarged fragmentary view of the attachment shown in FIGURE 4 when taken along the line 5—5 in FIGURE 4 and with parts removed.

FIGURE 6 is a view generally taken along the line 6—6 of FIGURE 1.

In general, the present invention is concerned with attachments or devices which can be easily installed on extrusion presses to enable the press to extrude sections having at least one cross-sectional dimension, such as its width, which is greater than the largest cross-sectional dimension of the cast metal body from which it is extruded.

For a more specific description of the invention, reference is made to the drawings appended hereto. With reference to the drawings, and in particular FIGURE 1 the reference numeral 1 designates a conventional cylindrical extrusion container for receiving a cast metal body such as a billet, to be extruded. This container is mounted in a conventional fashion in the art and is preferably comprised of an outer cylindrical member 3 and a suitable liner 5 which is shrunk-fit into the member 3.

A stem 7 which is motivated by a suitable hydraulic ram (not shown) is adapted to enter bore 5' of the liner 5 of container 1 at one end thereof for applying pressure to the billet B through dummy block 9. The dummy block 9 has a diameter somewhat less than the diameter of the bore 5' of liner 5 and transmits the pressure from the stem 7 to the billet B.

A tool assembly 11 is supported at the extremity of container 1 opposite to that which admits the ram stem 7. The tool assembly 11 comprises a tool container 13 constructed in the form of an open top channel for housing die assembly 15 and bolster 27. Die assembly 15 is comprised of die holder 17, die 19 and backer 25. Die holder 17 has a chamfered inner surface 21 for engagement with the chamfered surface 23 of die 19. Die 19 and backer 25 fit within die holder 17; backer 25 and die holder 17 being butted against bolster 27 thereby preventing longitudinal shifting of die 19 during the extrusion operation. The tool container 13 has flange 14 which engages die holder 17 and flange 16 which engages bolster 27. As in the description given above, it is usual practice to have the tool assembly of an extrusion press contain the die assembly, die backer and bolster in order that the tool assembly may be easily separated from the container after a billet has been extruded and before shearing the butt from the extrusion and preparing for a subsequent extrusion. The gate lock 29, which is a horse-shoe shaped sliding member actuated by a hydraulic cylinder (not shown), is disposed between tool assembly 11 and end platen 31 and holds tool assembly 11 against the force of the press. The function of the backer 25 and bolster 27 is to support the die 19, to resist die distortion and to distribute the pressure evenly over the gate lock 29. The gate lock 29 in turn distributes this pressure to end platen 31 which is suitably mounted on the extrusion press frame (not shown).

The attachment member 33 of the invention is a generally frustro, conically shaped member and is preferably comprised, as shown in FIGURES 1 and 2, of inner section 35 and outer section 37 which is contiguous and concentric relationship with inner section 35, said outer section 37 being attached to inner section 35 by a suitable means, such as by a shrink fit. Inner section 35 has a tapered opening 39 which, as shown in FIGURE 1 tapers outwardly in the direction of extrusion flow. Bore 39, as shown in FIGURE 2 has a circular opening 39' at the extremity which abuts cylinder 1 and terminates at the other extremity which abuts the die 19 in an opening 39" having an elliptical cross-sectional configuration. The major axis of opening 39" is greater than the diameter of the opening 39' as well as the bore 5' of the insert 5 of the container or the diameter of the billet B. The minor axis of the opening 39" having the elliptical cross section as shown in FIGURE 2 may also be at least equal to the diameter of the opening 5' defined by the liner 5 provided in the container 1. Outer section 37 has on its outer surface a flange 36 which engages retainer ring 41. Retainer ring 41 in turn is removably mounted by suitable means, such as by bolts 41' to the container 1 in such a manner that it is removably associated with the container. It will thus be seen that through the provision of the attachment 33 defining the invention an extruded section whose largest cross-sectional dimension is greater than the diameter of the billet or or inner diameter of the container may be extruded and that the volume defined by opening 39 defines an upset zone. By providing the die 19 with a die opening 20 having a dimension at least equal to the diameter of the billet B and other cross-sectional dimensions which are substantially less than the diameter or cross-sectional dimension of the billet, a wide extrusion of this nature may be produced. An example of such an extrusion is shown as E in FIGURES 1 and 3 wherein an integrally stiffened wing panel section having one cross-sectional dimension greater than billet B is shown.

In FIG. 4 is shown a second embodiment of the apparatus for practice of the invention by means of which an extrusion having at least one cross-sectional dimension which is greater than the diameter of the billet can be produced. In FIGURE 4 the attachment designated as 43 is supported in tool container 59 of tool assembly 57 rather than being mounted on container 1. Attachment 43 is a cylindrical member and may be comprised, as shown in FIGURE 4 and in FIGURE 5, of multiple insert members 47, 49, 51 and 53 and an outer ring member 45, said insert members being machined on their adjoining surfaces so as to define a roughly rectangular opening 55 which defines an upset zone. Inserts 47 and 49 are identical and are each of approximately semi-circular cross-section. Inserts 51 and 53 are also identical and have outer cylindrical surfaces. When inserts 47, 49, 51 and 53 are assembled as shown in FIGURE 5 their outer surfaces define a complete cylindrical surface and the inserts also define the roughly rectangular opening 55 which has one cross-sectional dimension greater than that of the billet B and greater than the diameter of the bore 5' of the liner 5 of container 1. As in the case of the aperture 39 of attachment member 33, the aperture or opening 55 is in open communication and alignment with both the container bore and the opening of the die. The inserts 47, 49, 51 and 53 have flanges on their outer surfaces which when assembled form a continuous circular flange 50 which engages outer ring 45 which is suitably fitted, such as by a shrink-fit, onto the assembled insert members 47, 49, 51 and 53. Outer ring 45 has a flange 46 which engages a flange 60 of tool container 59. It is advantageous in an embodiment such as shown in FIGURE 4 when the opening in the attachment is not greater in all dimensions than the diameter of the billet or billet container to have the attachment supported by the tool container. As shown in FIGURE 4, tool assembly 57 is comprised of tool container 59, attachment 43, die assembly 61 and bolster 71. Tool container 59 is in the form of an open top channel like the previously mentioned tool container 13. Die assembly 61 is comprised of die holder 63, die 67 and backer 69. Tool container 59, which is in the form of an open topped channel like the previously mentioned tool container 13, has flange 60 which engages attachment 43 and a flange 62 which engages bolster 71. An arrangement such as this is desirable in order that the components of the extrusion press in engagement with the billet may be easily separated after extrusion in order that the butt of the billet may be sheared from the extrusion in order that the press may be readied for the next extrusion cycle. Other means for mounting attachment 43 could be used, for example, attachment 43 could be mounted on the container 1 by use of a suitable quick connecting and disconnecting retaining ring. Also, the attachment 43 could be mounted outside of tool container 59 by mounting said attachment 43 by a suitable means, such as by bolts, to die holder 63. The tool assemblies 11 and 57 are removably affixed to the container 1 in a manner well-known in the art, such as in the manner shown in Thornton et al. patent 2,530,669. Thus, for example, bolts 13' may be employed for removably affixing these two die assemblies along with the various attachments and dies associated therewith to the container 1. In this way the tool assemblies as well as the associated dies and attachments may be initially assembled and dismantled in a convenient fashion.

The operation of the above described devices is described with reference to the embodiment shown in FIGURES 1 and 2, however, the description is also applicable to the embodiment shown in FIGURES 4 and 5. A heated billet B is placed in extrusion container 1 after which the dummy block 9 and ram stem 7 are moved into the extrusion container 1 to engage billet B. The tool assembly 11 is moved into operative position and gate lock 29 is brought into position in order to distribute the extrusion pressure to the end platen 31. As ram stem 7 is forced to move in the direction of extrusion, the metal in the billet B is forced to be upset in the laterally transverse cross-sectional portions of the aperture of the attachment member located immediately adjacent the opening of the die and against the somewhat abrupt upset shoulder formed by the portion of the die surface facing the attachment member or in the upset zones of both the attachment of FIGURE 1 as described or that of FIGURE 4 the modified version of the invention. The metal in the opening 39 is then forced through the die opening 20 thereby forming extrusion E. By forcing the billet through the upset zone formed by the aperture of the attachment member, the metal of the billet is advantageously upset into a shape having cross-sectional thickness dimensions which are greater than the corresponding dimensions of the die opening immediately prior to the billet's entrance into the die opening, thereby insuring a complete filling of the die opening as the metal of the billet passes therethrough.

It has been found that by using the apparatus of the invention that the capacity of an extrusion press can be substantially increased. For example, to produce an extrusion having a cross-sectional dimension of 24 inches would heretofore require a billet having at least a diameter of 25 inches (and a container of commensurate dimensions for receiving the billet) and a 14,000 ton press. By the practice of the invention, it has been found that the same extrusion can be produced from a 20 inch diameter billet in an 8000 ton press.

It is obvious that many changes or modifications may be made without departing from the spirit and scope of the invention and, accordingly, the invention is not limited by what has been disclosed in the foregoing description but only by the appended claims wherein what is claimed is:

1. An apparatus for effecting extrusion of a metal billet to form a solid product that has a width substantially greater than its thickness comprising in combination a billet container provided with a bore for receiving the metal billet, a die provided with an opening disposed adjacent the exit end of said container bore, the opening of said die being in alignment with the bore of the container and having a configuration whereby at least one cross-sectional dimension of the said die opening is at least equal to the largest cross-sectional dimension of the metal billet and other cross-sectional dimensions of said die opening are substantially less than any of the cross-sectional dimensions of said billet, an apertured attachment member removably associated with the container and disposed intermediate the container and the die, the aperture of said attachment member being in open communication and alignment with both the said container bore and the opening of said die, the laterally transverse cross-sectional portions of the aperture of said attachment member which are located immediately adjacent the opening of said die being greater than the corresponding laterally transverse cross-sectional dimensions of the die opening that produce the thickness of said solid product thus making a portion of the die surface facing said attachment member form an abrupt upset shoulder to correct the flow of work metal from said billet whereby as the metal of said billet is forced through the said aperture of the attachment member the metal will be upset into a shape having cross-sectional thickness dimensions which are greater than the corresponding dimensions of the die opening immediately prior to its entrance into the die opening and will insure a complete filling of the die opening as the metal passes therethrough, and means for progressively forcing the billet from the container bore completely through the aperture of the attachment member and then completely through the opening of the die to form a shaped metal article.

2. An apparatus as defined in claim 1 wherein the bore of the container is circular and the aperture of said attachment member tapers immediately adjacent the container bore from a circular cross-sectional configuration that has a diameter approximately equal to the diameter of the bore of the container to an elliptical cross-sectional configuration which has a dimension along the major axis thereof that is greater than both the largest cross-sectional dimension of the die opening and the diameter of the bore of the container.

3. An apparatus as set forth in claim 1 wherein the bore of the container is circular and said attachment member is comprised of multiple insert members and a ring member, said insert members when assembled within said ring member defining a generally rectangular-shaped aperture and upset zone, the greatest cross-sectional dimension of which is greater than the diameter of the bore of the container as well as the largest cross-sectional dimension of the die opening.

References Cited in the file of this patent

UNITED STATES PATENTS

| | | |
|---|---|---|
| 347,607 | Hooper | Aug. 17, 1886 |
| 1,717,620 | Page | June 18, 1929 |
| 2,172,867 | Dreyer | Sept. 12, 1939 |
| 2,389,876 | Sequin | Nov. 27, 1945 |
| 2,401,235 | Farr et al. | May 28, 1946 |
| 2,528,260 | Cademartori | Oct. 31, 1950 |
| 2,530,669 | Thornton et al. | Nov. 21, 1950 |
| 2,673,645 | Moczik | Mar. 30, 1954 |
| 2,867,321 | Swanson | Jan. 6, 1959 |
| 2,894,623 | Walton | July 14, 1959 |

FOREIGN PATENTS

| | | |
|---|---|---|
| 895,100 | France | Mar. 27, 1944 |
| 7,419 | Great Britain | 1901 |
| 9,442 | Great Britain | 1897 |
| 906,925 | Germany | Mar. 18, 1954 |